(12) United States Patent
Parma et al.

(10) Patent No.: US 10,965,244 B2
(45) Date of Patent: Mar. 30, 2021

(54) HANDLING SYSTEM FOR SOLAR ENERGY RECEPTOR DEVICES

(71) Applicant: REM TEC S.R.L., Casalromano (IT)

(72) Inventors: Paolo Parma, Chiari (IT); Alessandro Reboldi, Rezzato (IT)

(73) Assignee: REM TEC S.R.L., Casalromano (IT)

( * ) Notice: Subject to any disclaimer, the term of this patent is extended or adjusted under 35 U.S.C. 154(b) by 134 days.

(21) Appl. No.: 16/060,345

(22) PCT Filed: Dec. 18, 2015

(86) PCT No.: PCT/IT2015/000315
§ 371 (c)(1),
(2) Date: Jun. 7, 2018

(87) PCT Pub. No.: WO2017/103953
PCT Pub. Date: Jun. 22, 2017

(65) Prior Publication Data
US 2018/0367092 A1    Dec. 20, 2018

(51) Int. Cl.
*H02S 20/32* (2014.01)
*F24S 25/10* (2018.01)
(Continued)

(52) U.S. Cl.
CPC .............. *H02S 20/32* (2014.12); *F24S 25/10* (2018.05); *F24S 25/50* (2018.05); *F24S 30/455* (2018.05);
(Continued)

(58) Field of Classification Search
CPC .......... H02S 20/30; H02S 20/32; H02S 30/10; F24S 30/40; F24S 30/45; F24S 30/455
See application file for complete search history.

(56) References Cited

U.S. PATENT DOCUMENTS

| 4,779,537 A * | 10/1988 | Hafner | E01B 25/24 |
| | | | 104/93 |
| 2006/0044511 A1* | 3/2006 | Mackamul | F16M 11/10 |
| | | | 353/3 |

(Continued)

FOREIGN PATENT DOCUMENTS

| EP | 2119940 A1 | 11/2009 |
| WO | 2010/103378 A1 | 9/2010 |

(Continued)

OTHER PUBLICATIONS

International Search Report and Written Opinion dated May 3, 2016, for corresponding International Application No. PCT/IT2015/000315.

(Continued)

*Primary Examiner* — Devina Pillay
(74) *Attorney, Agent, or Firm* — Morgan, Lewis & Bockius LLP (57) ABSTRACT

A handling system for receptor devices of solar energy suitable for allowing the handling of said devices on a first axis and on a second axis, substantially orthogonal with respect to each other, said system being constrainable on fixed structures composed of supporting poles kept in position by a network of tie-rods. The system comprises a main tube rotating around said first axis, to which a plurality of secondary tubes are connected, also rotating around their own axis, fixed substantially perpendicularly to the main tube, the receptor devices being fixed on said secondary tubes. The main rotating tube comprising both the handling mechanism around the first axis and the handling mechanism around the second axis activated by a respective first motor and second motor.

9 Claims, 6 Drawing Sheets

(51) Int. Cl.
*F24S 25/50* (2018.01)
*F24S 30/455* (2018.01)
*H02S 20/10* (2014.01)
*H02S 30/10* (2014.01)
*F24S 30/00* (2018.01)

(52) U.S. Cl.
CPC .............. *H02S 20/10* (2014.12); *H02S 30/10* (2014.12); *F24S 2030/134* (2018.05); *F24S 2030/136* (2018.05); *Y02E 10/47* (2013.01)

(56) References Cited

U.S. PATENT DOCUMENTS

| | | |
|---|---|---|
| 2011/0132433 A1 | 6/2011 | Tanaka et al. |
| 2011/0315197 A1* | 12/2011 | Angoli .................... H02S 20/10 136/246 |
| 2012/0152312 A1* | 6/2012 | Miller ................... G01S 3/7861 136/246 |

FOREIGN PATENT DOCUMENTS

| WO | 2012/046134 A1 | 4/2012 |
|---|---|---|
| WO | 2014/072280 A1 | 5/2014 |

OTHER PUBLICATIONS

International Preliminary Report on Patentability dated Nov. 9, 2017, for corresponding International Application No. PCT/IT2015/000315.

* cited by examiner

HANDLING SYSTEM FOR SOLAR ENERGY RECEPTOR DEVICES

The present invention relates to a handling system for devices suitable for receiving solar light, for example photovoltaic panels. In particular, the system of the present invention allows the handling of said devices on two axes to enable photovoltaic panels or other devices suitable for capturing solar energy, to remain correctly oriented towards the sun.

Handling systems of solar panels on two axes are known and are technically known as "solar trackers".

The main objective of a tracker is to maximize the efficiency of the device housed on board. In the photovoltaic field, the modules assembled on board a tracker are generally arranged geometrically on a single panel, which avoids the use of a tracker for every single module. The greater the perpendicular alignment with the solar rays, the greater the conversion efficiency and energy produced, with the same surface, will be, and the smaller the surface of the solar panel necessary, with the same power required, the lower the costs of the plant will be.

The most sophisticated trackers have two degrees of freedom, whereby the orthogonal of the photovoltaic panels is aligned perfectly and in real time with the solar rays. The most economical, but not the only, way for producing them is to mount a tracker on board of another. With these trackers, increases in electric production are registered, which reach even 35%-40%, against, however, a greater construction complexity.

A type of this solar tracker is disclosed in patent WO2010/103378 which describes a bearing structure composed of supporting poles kept in position by a network of tie-rods, both the supporting poles and the tie-rods being fixed in the ground by means of a hinged bolt.

The solar tracker comprises a main horizontal load-bearing tube that is able to rotate around its own axis, to which a plurality of secondary tubes are connected, fixed perpendicularly to the main tube and which can be rotated around their own axis. Solar panels are fixed to said secondary tubes. The ends of the main tube of the tracker rest and are fixed on said supporting poles. The electric connection cables of the various panels are situated inside the main tube and externally carry the current generated by the same.

The control system of the tracker, integrated in the tracker itself, is capable of keeping the panels constantly oriented towards the sun, rotating both the main tube and the secondary tubes so that the sun is perpendicular to the capturing surface of the panels.

Patent WO2010/103378 describes a structure of supporting poles which are such as to also support wind modules. This structure is produced in a two-dimensional "checkerboard" form and can be installed also on agricultural land as it is elevated and the distance between the supporting poles is such as to allow the passage of even massive agricultural means.

The solar panels and handling mechanisms of the same obviously have quite a considerable weight and therefore one of the problems to be solved is how to make the system as light as possible.

Furthermore, the encumbrance of both the panels and the bearing structure must also be reduced to the minimum to allow the solar light to reach the underlying soil of the agricultural land.

The objective of the present invention is to solve the drawbacks indicated above by providing a system having the characteristics of the enclosed claim 1.

The characteristics and advantages of the present invention will appear more evident from the following illustrative and non-limiting description of an embodiment of the invention, referring to the enclosed schematic drawings, in which.

With reference to the above figures, the handling system for devices suitable for receiving solar light according to the present invention allows the handling of said devices on a first axis X and on a second axis Y, substantially orthogonal with respect to each other, allowing it to keep a correct orientation towards the sun. Said devices, for example, are photovoltaic panels or other devices suitable for capturing solar energy.

Figure 1:
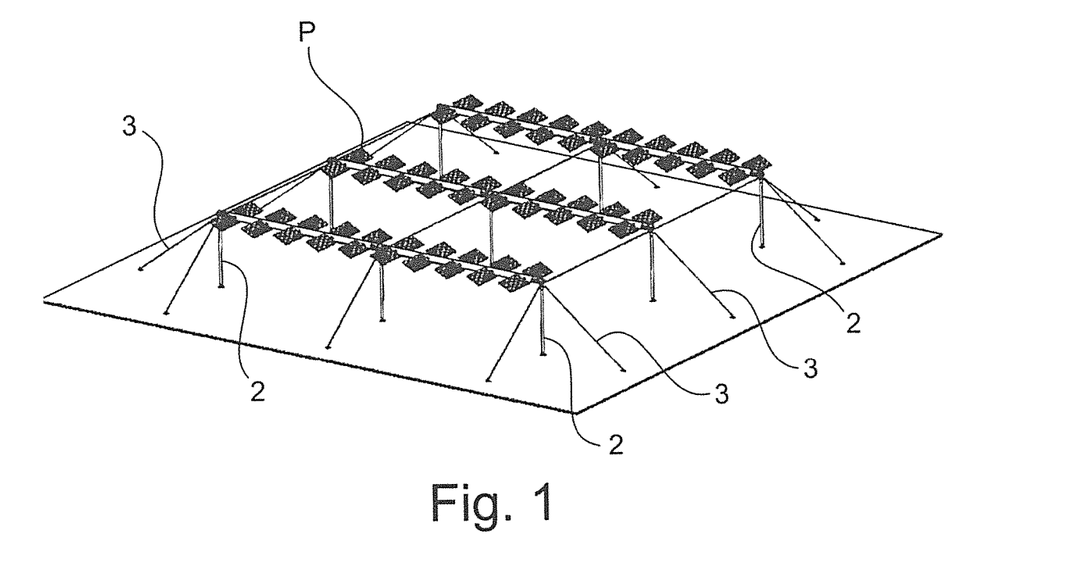
FIG. 1 illustrates the supporting structure with the handling system according to the present invention, installed.

For this purpose, it can be installed on bearing structures composed of supporting poles 2 kept in position by a network of tie-rods 3, both the supporting poles and the tie-rods being fixed in the ground by means of a hinged bolt. Said structure can advantageously have a two-dimensional configuration, for example of the "checkerboard" type, and can also be installed on agricultural land, as it is elevated, and the distance between the supporting poles is such as to allow the passage of even massive agricultural means.

When the handling systems have been installed on this structure, said axes X and Y can be substantially horizontal or slightly tilted.

Figure 2:
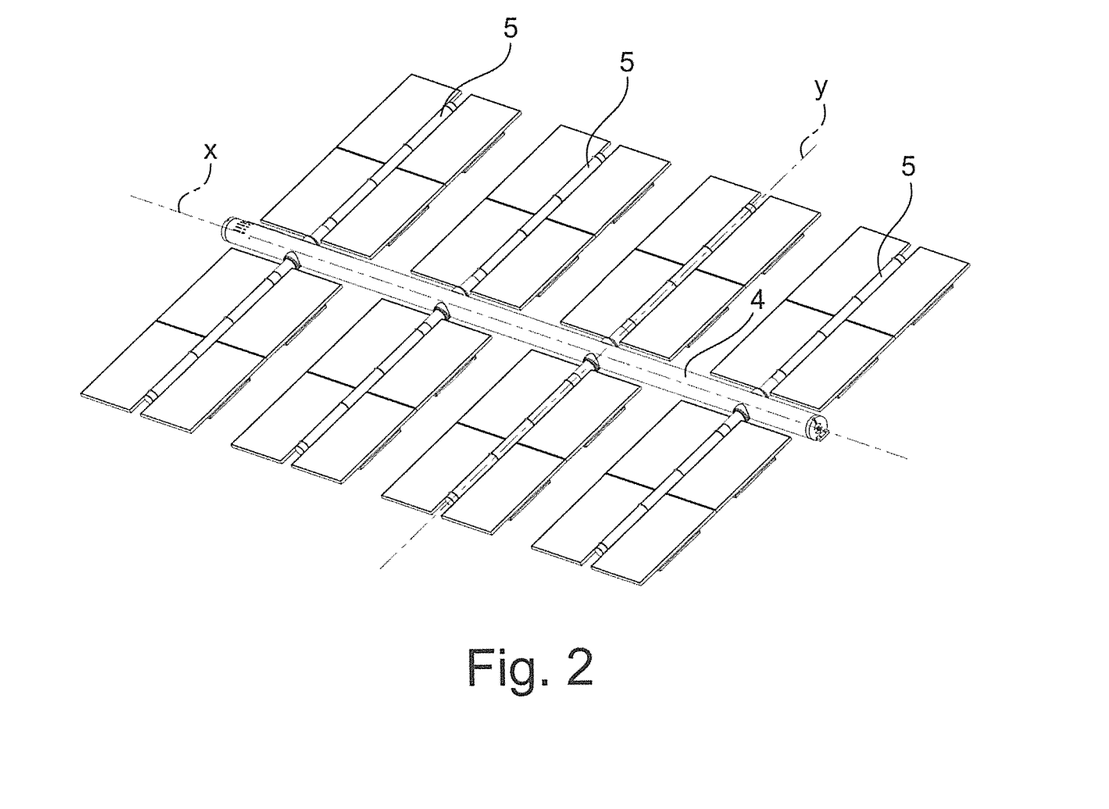
FIG. 2 illustrates the handling system according to the present invention.

The handling system comprises a main tube 4 rotating around its own axis, and, when operating, arranged substantially on a horizontal plane, to which a plurality of secondary tubes 5 are connected, also rotating around their own axis, preferably fixed perpendicularly to the main tube. The receptor devices, in this specific case illustrated photovoltaic panels P, are fixed on said secondary tubes. The ends of the main tube 4 rest and are fixed on said supporting poles 2 by fixing means which allow a rapid and safe assembly of the structure.

Figure 3A:
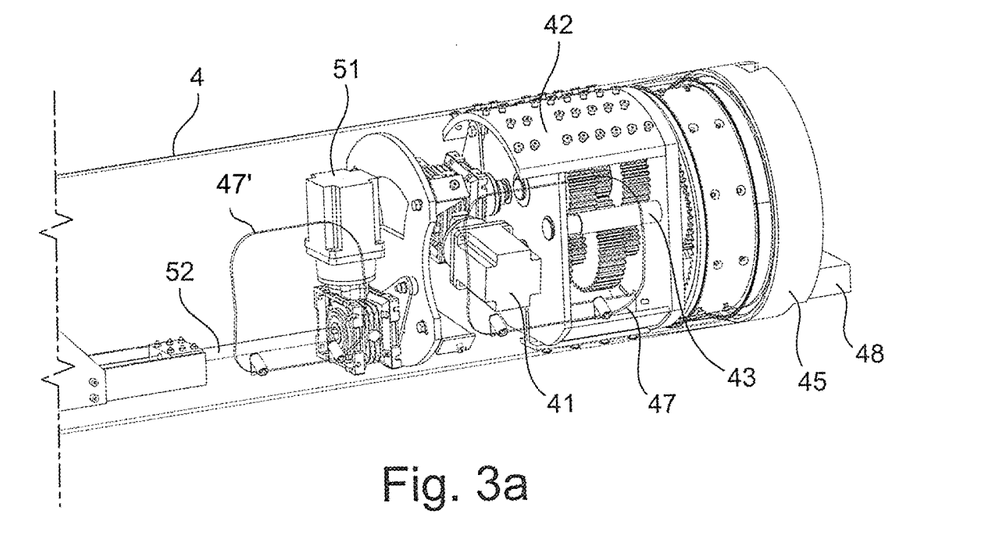
FIGS. 3a and 3b illustrate a first handling mechanism of the system along the first axis.
Figure 3B:
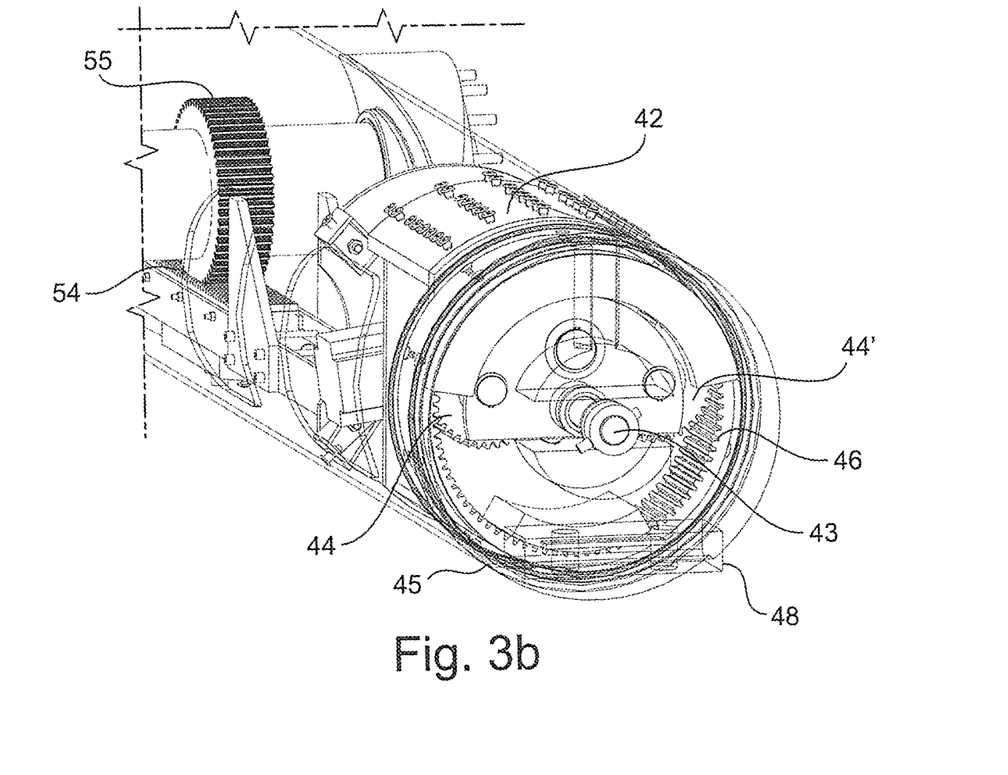

The main rotating tube 4 comprises both the handling mechanism around the first axis and also the handling mechanism around the second axis. In particular, it comprises, in the proximity of at least one of its ends and in its interior, a first motor 41 which is interfaced with a reducing mechanism 42 in which there is a central shaft 43 which receives the rotation of said motor and at least a pair of rotating satellite pinions 44 and 44', symmetrical with respect to said shaft and rotating in compliance with each other. Said end of the main tube 4 is engaged in a tubular flange 45, which is connected to fixed parts of the structure such as, for example, the supporting poles, provided on its internal circumference with a round rack 46 which encounters the pair of pinions.

The motor is advantageously positioned with its axis perpendicular to said central shaft, optimizing the spaces inside the tube and facilitating both its assembly and disassembly.

The handling system operates in relation to the movement around the first axis X as follows. The tubular flange 45 is fixed and consequently, when the motor is activated and the pinions are rotated, the whole structure composed of the main tube rotates around its own axis X.

Figure 4A:
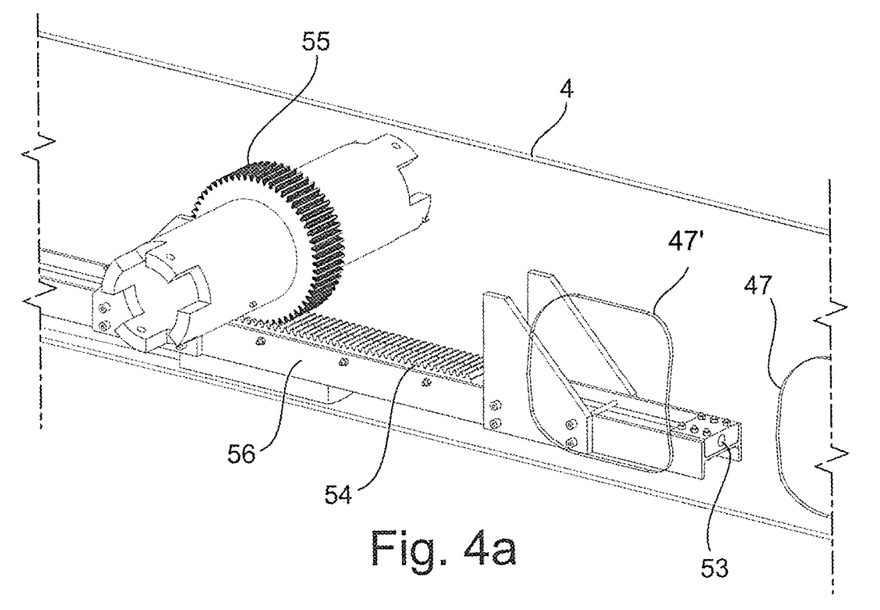
FIGS. 4a and 4b illustrate a second handling mechanism of the system along the second axis.
Figure 4B:
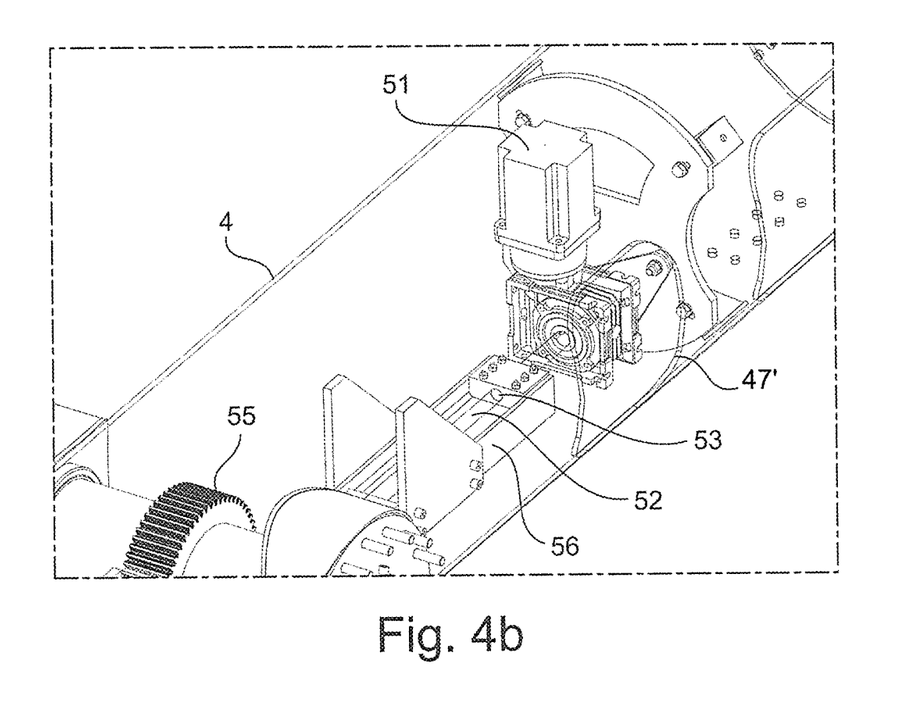

The handling mechanism around the second axis is also included inside the main tube, and comprises a second motor 51 which, associated with a reducing system, rotates a worm screw 52 positioned longitudinally in the main tube 4. Said worm screw penetrates a threaded hole 53 of a lead screw, fixed to a straight pushing profile 56, also positioned longitudinally inside the main tube to which a series of racks 54 are fixed.

Along their route, the racks encounter a plurality of gears 55, each engaged on a secondary tube in the intersection position of these with the main tube.

The racks are positioned on a pushing profile 56 which allows them to run longitudinally with respect to the main tube.

The second motor, together with a reducing mechanism, is advantageously positioned with its axis perpendicular to said worm screw, optimizing the spaces inside the tube.

The handling system operates in relation to the movement around the second axis Y as follows.

The motor 51 causes the worm screw 52 to rotate, which, in turn, rotating in the threaded hole 53 of the lead screw, moves the pushing profile along the axis of the tube 4 and with it the rack 54. The rotation gears 55 that encounter the various racks are rotated and, as they are integral with the secondary tubes 5, allow the rotation of the same and therefore the panels around the axis Y.

The main tube is also provided with a pair of openings 47 and 47' closed by equivalent lids positioned in correspondence with the motors and reducing mechanisms.

The handling system comprises means for constraining a pair to each pole of the bearing structure in pairs, which, on each tubular flange 45, comprise a supporting plate 48 on the pole (provided with suitable holes for fixing to the pole itself). Furthermore, a groove 49 is present on said flange, preferably positioned vertically and also preferably having a dovetail conformation.

Figure 5A:
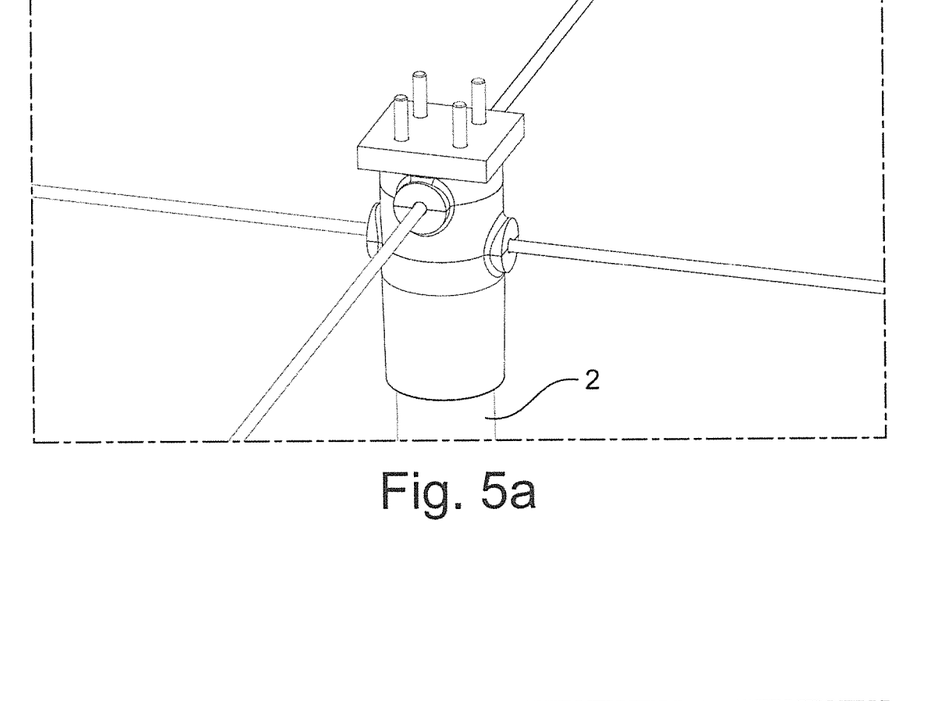
FIGS. 5a-5d illustrate the fixing mechanism of the handling system and the poles of the supporting structure.
Figure 5B:
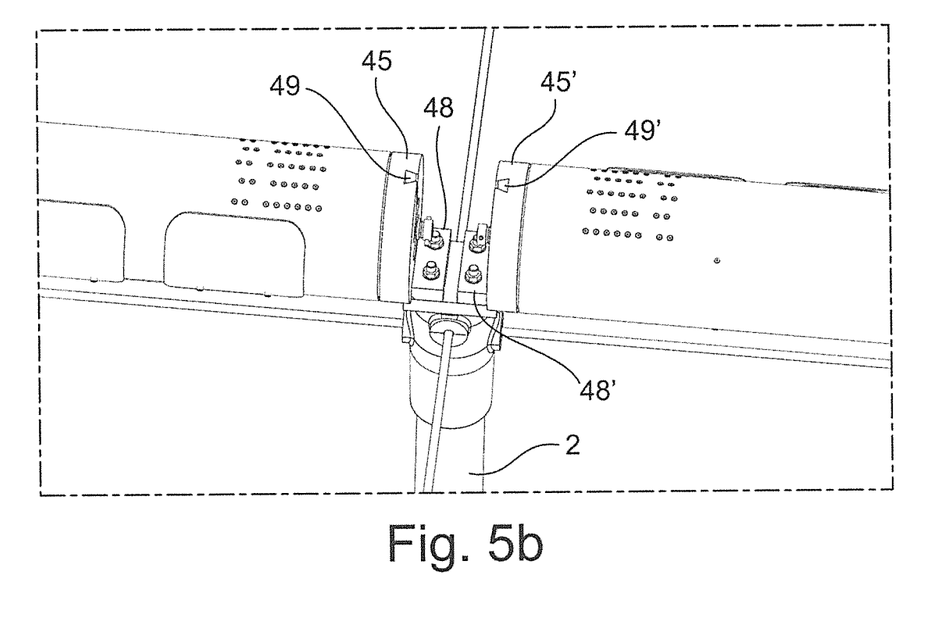
Figure 5C:
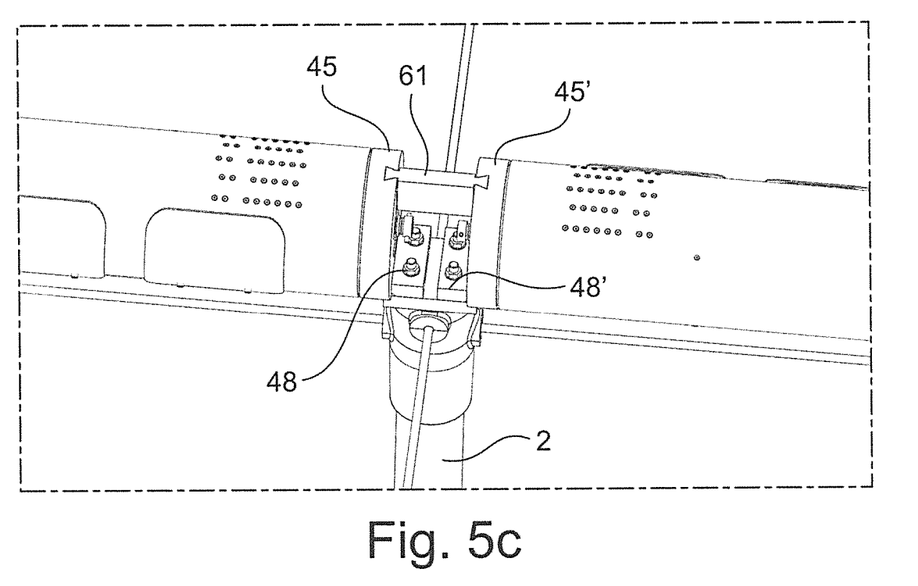
Figure 5D:
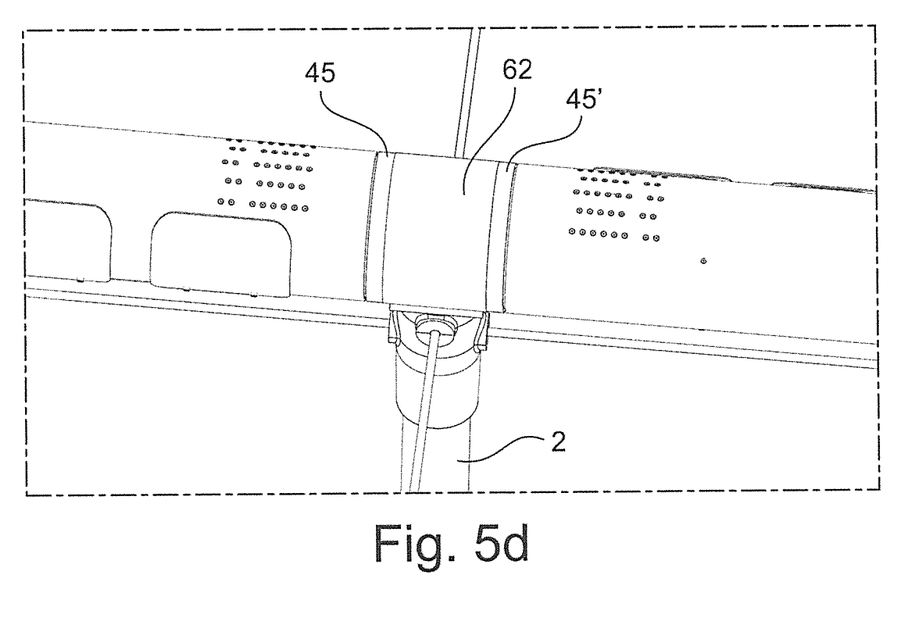

The handling systems are positioned and constrained on the poles of the structure in pairs on opposite sides of the pole itself, as illustrated in particular in FIG. 5b. An insert 61 is positioned inside guides and forms the connection element between one system and the next, therefore making the connection of the same with the pole 2 of the structure by means of the plate 48, more reliable. The constraint is completed by a sleeve 62 which joins the two main adjacent tubes 4 and 4'.

Figure 6A:
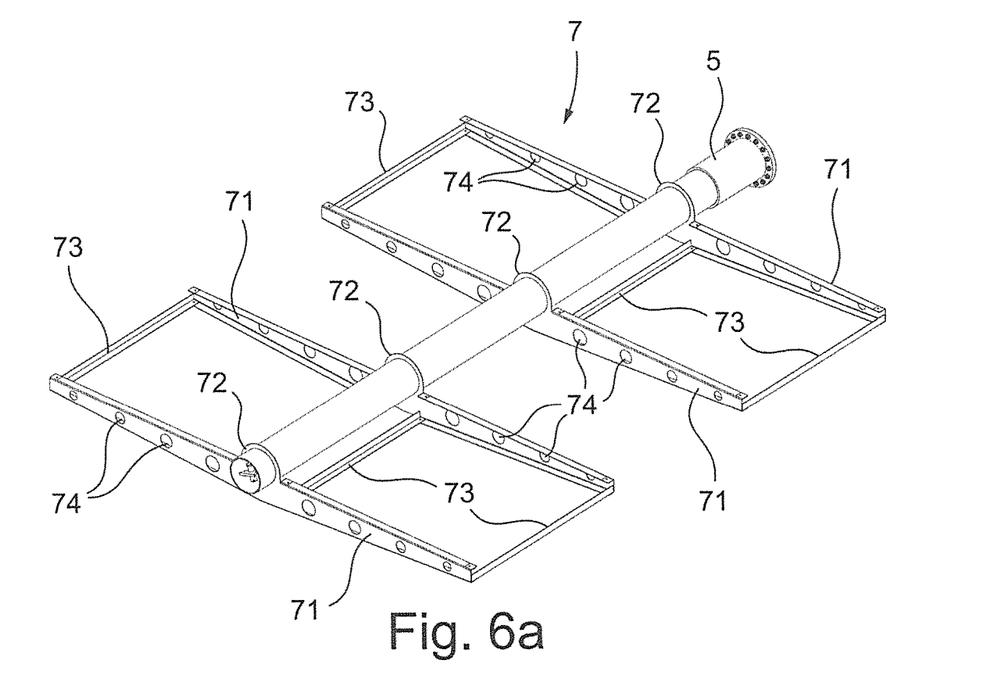
FIGS. 6a and 6b illustrate the panel-holder frame associated with the secondary tube according to the present invention.
Figure 6B:
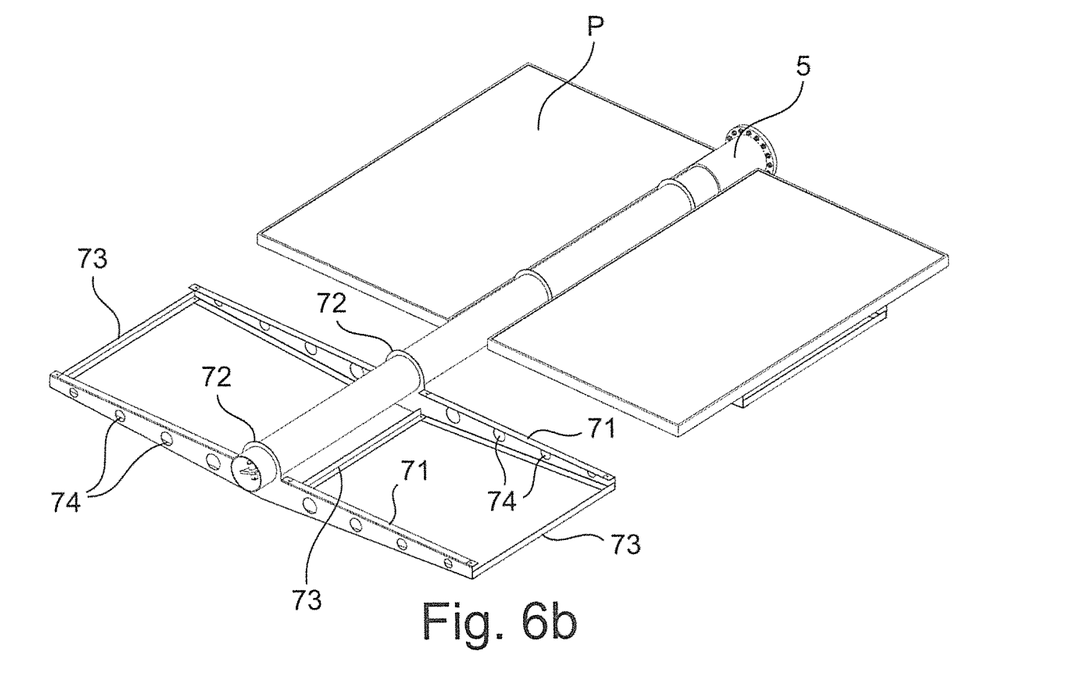

A panel-holder frame 7 is associated with the secondary tube 5, said panels comprising at least one pair of ribs 71 associated with the secondary tube by means of sleeves 72 fixed to the same secondary tube. Connection cross-pieces 73 are envisaged at least at the ends and in the central area of the same ribs.

The ribs are provided with holes 74 along their surface.

The structure of said frame allows the combination of secondary tube and panels to have a balanced centre of gravity on the rotation axis Y without creating unbalancing and dangerous moments of resistance especially in the presence of wind.

Suitable types of motors for moving the tubes are stepper motors and the presence of gear motors and transmission effected through gears, allows an improved reliability of the structure, above all with the passing of time. Furthermore, all the mechanical and electrical elements are contained in the main tube and are therefore protected from atmospheric agents, with an increase in the operating life.

The stepper motors used preferably have an operating torque of about 3 Nm.

Considering the torque of the stepper motor and overall transmission ratio, the handling system can reach an adequate driving torque on the main axis.

Said torque is a design constraint due to the necessity of overcoming possible resistance due to the wind. The handling system equipped with panels in a typical case, could in fact be produced with main tubes having a length of 12 m, on parallel rows positioned at a distance ranging from about 8 to 15 m with poles from 4 to 6 m high, and dimensional panels up to a number of 32, fixed to tubes spaced apart by about 3 m. With this configuration, there are no limits for the type of crops and size of agricultural machines that must pass under the bearing structure.

If the load torque due to the wind is higher than the driving torque, the mechanical friction will allow the main tube to rotate so as to avoid damage to the transmission system.

The materials for the various parts have obviously been adequately selected for a proper balance between weight and robustness.

The movements of the motors are controlled by a specific electronic controller which determines the angulation that the panels must have during the day and in all climatic conditions.

The system envisages that the main tubes be assembled on a pole with the endpoints that comprise both adjacent handling mechanisms.

In this way, a single electronic controller can be used for controlling the movement of the two systems contemporaneously, which, however, continue to move independently.

The electronic card of said controller is open to different communication systems (for example, Wi-fi, RS485 cable or optical fibre). Either of these solutions can be adopted, depending on the requirements.

The invention claimed is:

1. A handling system for receptor devices of solar energy suitable for allowing the handling of the devices on a first axis and on a second axis, substantially orthogonal with respect to each other, the system being constrainable on a fixed structure composed of supporting poles kept in position by a network of tie-rods, comprising:
   a main tube rotating around the first axis, to which a plurality of secondary tubes are connected such that the secondary tubes are also rotating around their own respective axes and are fixed substantially perpendicularly to the main tube, the receptor devices being fixed on respective ones of the secondary tubes, the main rotating tube comprising a handling mechanism around the first axis activated by a first motor and a handling mechanism around the second axis activated by a second motor,
   the handling mechanism around the second axis comprising a series of racks positioned longitudinally inside the main tube which move along the first axis activated by the second motor that is also positioned inside the main tube, wherein along the route of the handling mechanism around the second axis encounters, in correspondence with the racks, a plurality of gears, each engaged on a respective secondary tube at an intersection position of the respective secondary tubes with the main tube, allowing the rotation of the second axis,
   wherein, the handling mechanism around the first axis comprises the first motor, positioned inside the main tube, the first motor is interfaced with a reducing mechanism in which there is a central shaft which is rotated by the first motor and at least a pair of rotating satellite pinions that are symmetrical with respect to the shaft and rotating in compliance with each other, a tubular flange being engaged on an end of the main tube, which is connected to the fixed structure, and a round rack provided on an internal circumference to encounter the pair of satellite pinions thereby allowing the rotation of the main tube around the first axis, wherein an axis of the first motor being perpendicular to the first axis of the main tube, wherein the main tube is one of a pair of main tubes, wherein the system further comprises a constraining mechanism configured to constrain the pair of main tubes to a bearing structure such that the main tubes of the pair of main tubes are aligned with each other, and wherein the constraining mechanism the pair of main tubes comprises a supporting plate on the tubular flange of each main tube of the pair of main tubes to be connected to a first pole among the support poles, a groove on an outer surface of the tubular flange of each main tube of the pair of main tubes, an insert being positioned inside the respective grooves to form a connection element between the pair of main tubes, and a sleeve joining the pair of main tubes, and wherein each groove is positioned vertically and has a dovetail conformation and ends of the insert have a dovetail shape corresponding to the dovetail conformation of the groove.

2. The system according to claim 1, wherein the series of racks is moved by means of a straight pushing profile by the second motor which, by means of a suitable gear mechanism, rotates a worm screw positioned longitudinally in the main tube, the worm screw penetrating a threaded hole of a lead screw of the series of racks.

3. The system according to claim 2, wherein an axis of the second motor is perpendicular to the worm screw.

4. The system according to claim 2, wherein the main tube is also provided with a pair of openings closed by equivalent lids positioned in correspondence with the motors and the reducing mechanism.

5. The system according to claim 1, wherein the receptor devices are panels capable of producing energy through solar collection.

6. A solar tracker comprising of claim 1, wherein a single electronic controller controls the movement of two adjacent systems contemporaneously, which, however, continue to move independently of each other, and wherein each of the two adjacent systems includes a respective main tube of the pair of main tubes.

7. The solar tracker according to claim 6, wherein the main tubes of the respective two adjacent systems are mounted on the first pole among the supporting poles with terminal parts of the respective main tubes that comprise the respective handling mechanisms being adjacent to each other.

8. The system according to claim 1, wherein each one of the receptor devices is fixed on respective ones of the secondary tubes by a panel-holder frame which holds a panel and comprises at least one pair of supporting ribs so as to allow the combination of the secondary tube, the panel-holder frame, and the panel to have a balanced centre of gravity on the second rotation axis.

9. The system according to claim 8, wherein the ribs are provided with holes along their surface.

* * * * *